(12) United States Patent
Nava

(10) Patent No.: US 6,386,857 B1
(45) Date of Patent: May 14, 2002

(54) ROTARY MACHINE FOR MAKING BLOW MOLDED PLASTIC VESSELS OR BOTTLES FROM A MOLDED PREFORM AND MOLD THEREFOR

(76) Inventor: Paolo Nava, Via Piazzalunga, 30, 24015, San Giovanni Bianco (IT)

( * ) Notice: Subject to any disclaimer, the term of this patent is extended or adjusted under 35 U.S.C. 154(b) by 0 days.

(21) Appl. No.: 09/491,211

(22) Filed: Jan. 25, 2000

(30) Foreign Application Priority Data

Nov. 18, 1999 (IT) .................................. MI99A02418

(51) Int. Cl.⁷ .................................................. B29L 49/30
(52) U.S. Cl. .......................... 425/526; 425/534; 425/540
(58) Field of Search ................................. 425/526, 534, 425/540, 541, 150

(56) References Cited

U.S. PATENT DOCUMENTS

| | | | |
|---|---|---|---|
| 4,487,568 A | * 12/1984 | Wiatt et al. ................. | 425/534 |
| 5,683,729 A | * 11/1997 | Valles ......................... | 425/526 |
| 5,968,560 A | * 10/1999 | Briere et al. ................. | 425/541 |
| 6,152,723 A | * 11/2000 | Winter et al. ................ | 425/534 |
| 6,186,760 B1 | * 2/2001 | Latham ....................... | 425/540 |

FOREIGN PATENT DOCUMENTS

WO    WO-98/35815 A1  *  8/1998

* cited by examiner

Primary Examiner—Robert Davis
(74) Attorney, Agent, or Firm—Hedman & Costigan, P.C.

(57) ABSTRACT

A rotary machine for making PET vessels or bottles starting from a molded preform comprises a rotary table driven by motor-reducer unit and supporting a plurality of molds, transmission and gripping wheels for gripping the preforms from an oven, a driving chain for driving the preforms through the oven and variable pitch star elements for supplying the preforms to the molds and withdrawing from the molds the formed bottles, a central control unit being moreover provided for independently controlling the above mentioned devices.

2 Claims, 11 Drawing Sheets

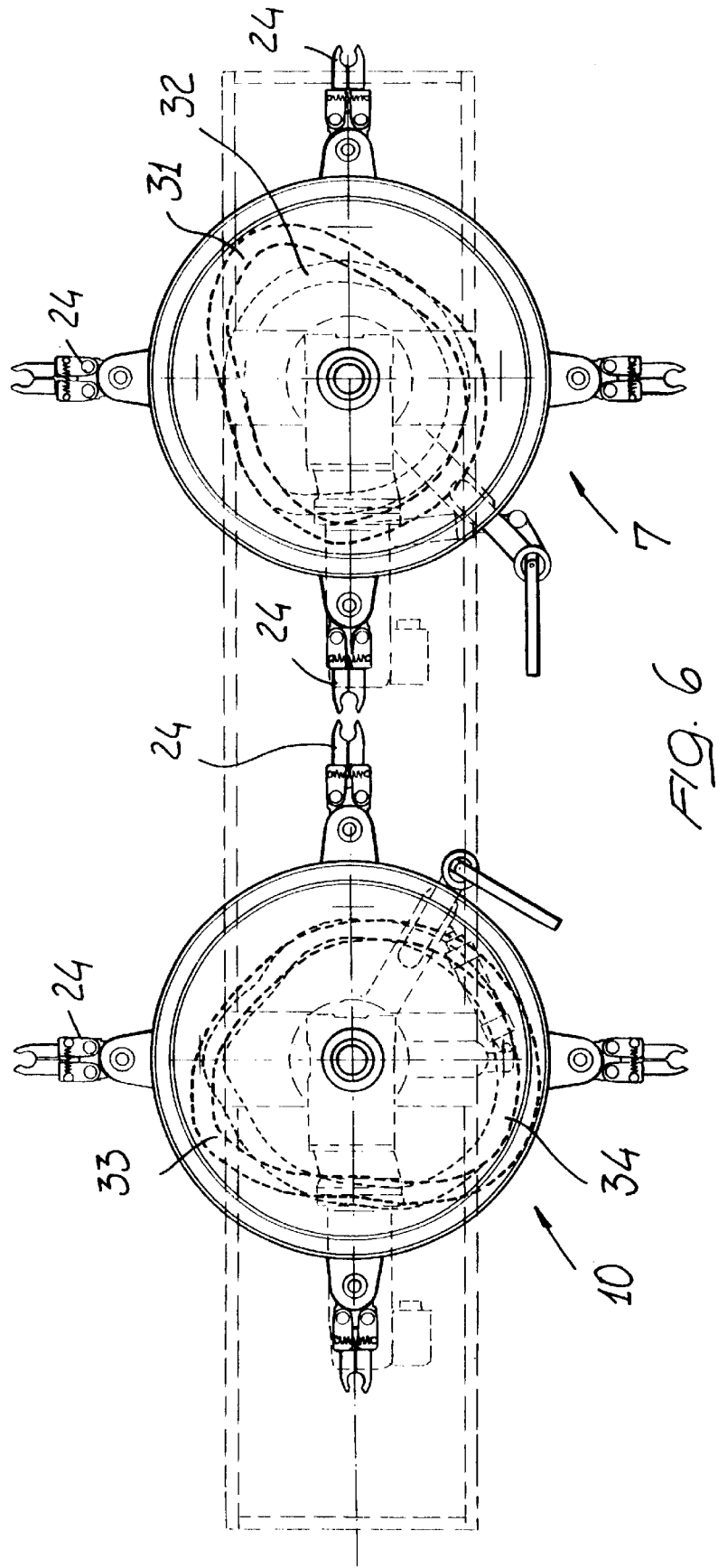

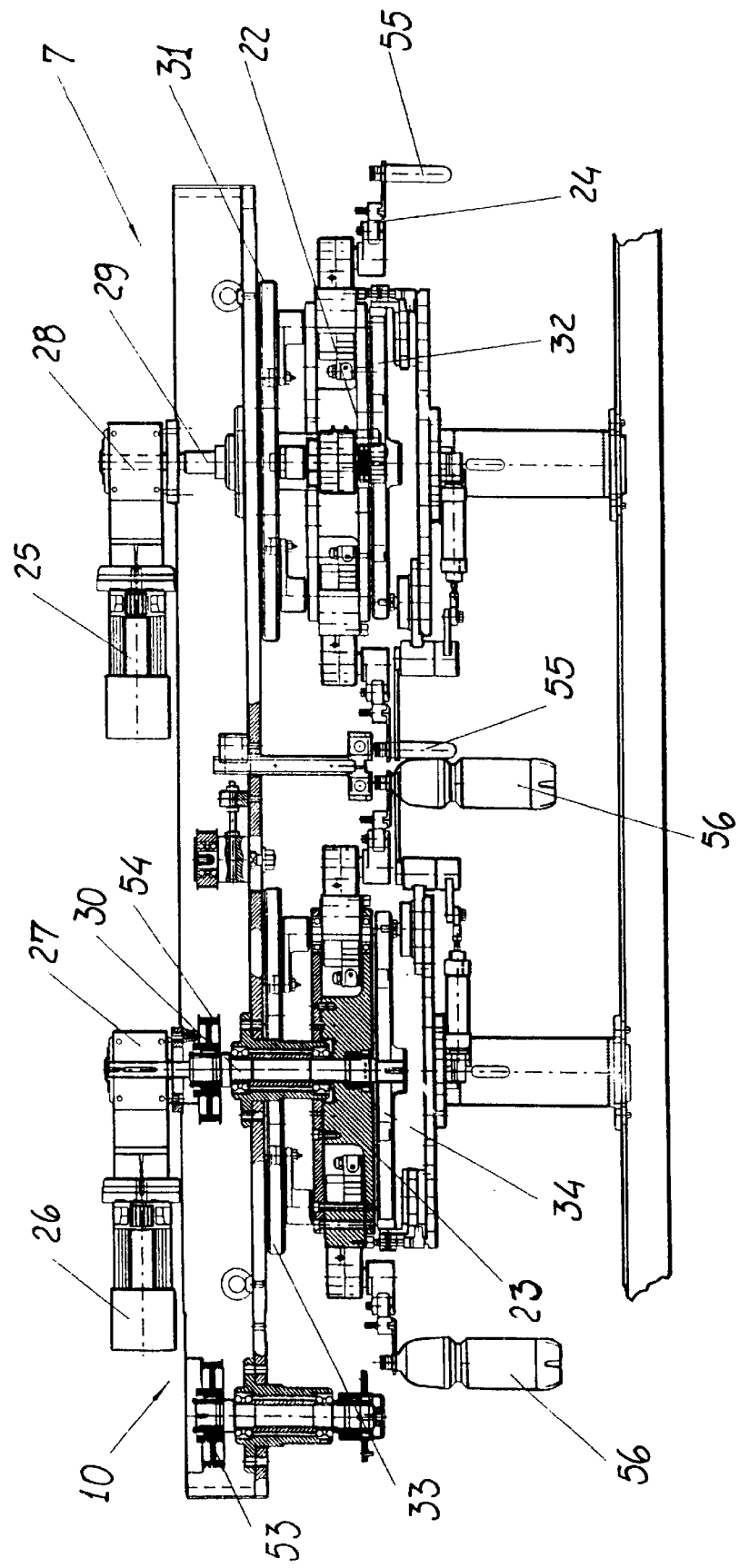

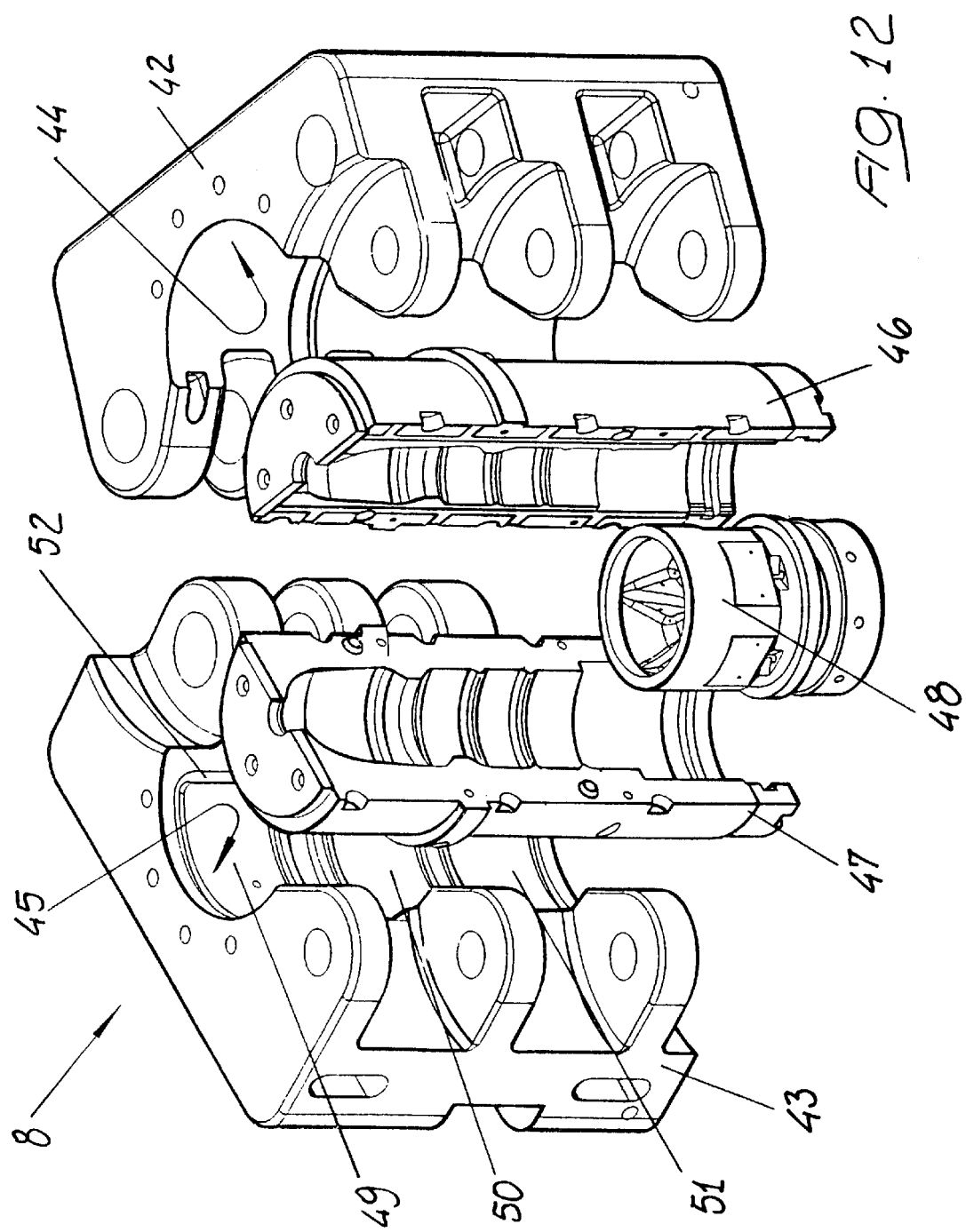

ROTARY MACHINE FOR MAKING BLOW MOLDED PLASTIC VESSELS OR BOTTLES FROM A MOLDED PREFORM AND MOLD THEREFOR

BACKGROUND OF THE INVENTION

The present invention relates to a rotary machine for making blow molded plastic vessels and bottles, which are made starting from a molded preform.

The invention further relates to a mold used for making the mentioned vessels and bottles.

More specifically, the field of the invention is that of the machine used for making plastic bottles and vessels, particularly PET bottles and vessels, by a blow molding method carried out on a molded preform or parison.

In making the mentioned vessels and bottles, a starting preform, or parison, constituted by a PET tubular body, closed at its bottom, is heated to a preset molding temperature, pre-stretched, pre-blown and further blown to an end forming pressure inside the bottle mold.

This method can be carried out by using on-line machines, of the stationary mold type, or rotary machines, provided with moving molds.

The main drawbacks of the conventional rotary machines derives from the fact that the kinematic chain driving all of the parts of the machine is a single chain and is controlled by a single driving motor which drives all of the mentioned parts of the machine.

Thus, all the machine parts depend on one another thereby, all the movable elements must be designed with a designing accuracy as high as possible.

This involves very complex and expensive machining operations, which negatively affect both the machine making cost and the operating cost thereof.

Moreover, the conventional bottle blow molding machines cannot be modified (for example provided with a different number of molds), because of their unflexible construction hindering any attempts of easily changing parts of the machine itself.

SUMMARY OF THE INVENTION

Accordingly, the main object of the present invention is to provide a machine of the above mentioned type which, with respect to the prior machines, can be easily constructed, is more reliable in operation, has a comparatively low cost and can be easily modified.

The above mentioned object, as well as yet other objects, which will become more apparent hereinafter, are achieved by a machine and mold according to the enclosed claims.

Preferred embodiments of the invention are defined in the remaining claims.

With respect to prior rotary blow molding machines, the rotary blow molding machine according to the present invention provides the advantages that it is much more operatively flexible, much more simple to be made, much more operatively reliable and much less expensive.

BRIEF DESCRIPTION OF THE DRAWINGS

The above mentioned and other characteristics, objects and advantages of the present invention will become more apparent hereinafter from the following disclosure of a preferred embodiment for making a blow molding rotary machine and blow molding mold for making bottles according to the present invention which is illustrated, by way of an exemplary but not limitative example, in the figures of the accompanying drawings, where:

FIG. 6 is a schematic view illustrating the variable-pitch star elements provided on the machine shown in FIG. 1;

FIG. 7 is a detail view illustrating, as seen from B, a detail of two variable pitch star elements included in the machine of FIG. 1;

FIG. 12 is an exploded view illustrating the blowing mold of FIG. 11;

DESCRIPTION OF THE PREFERRED EMBODIMENTS

Figure 1:
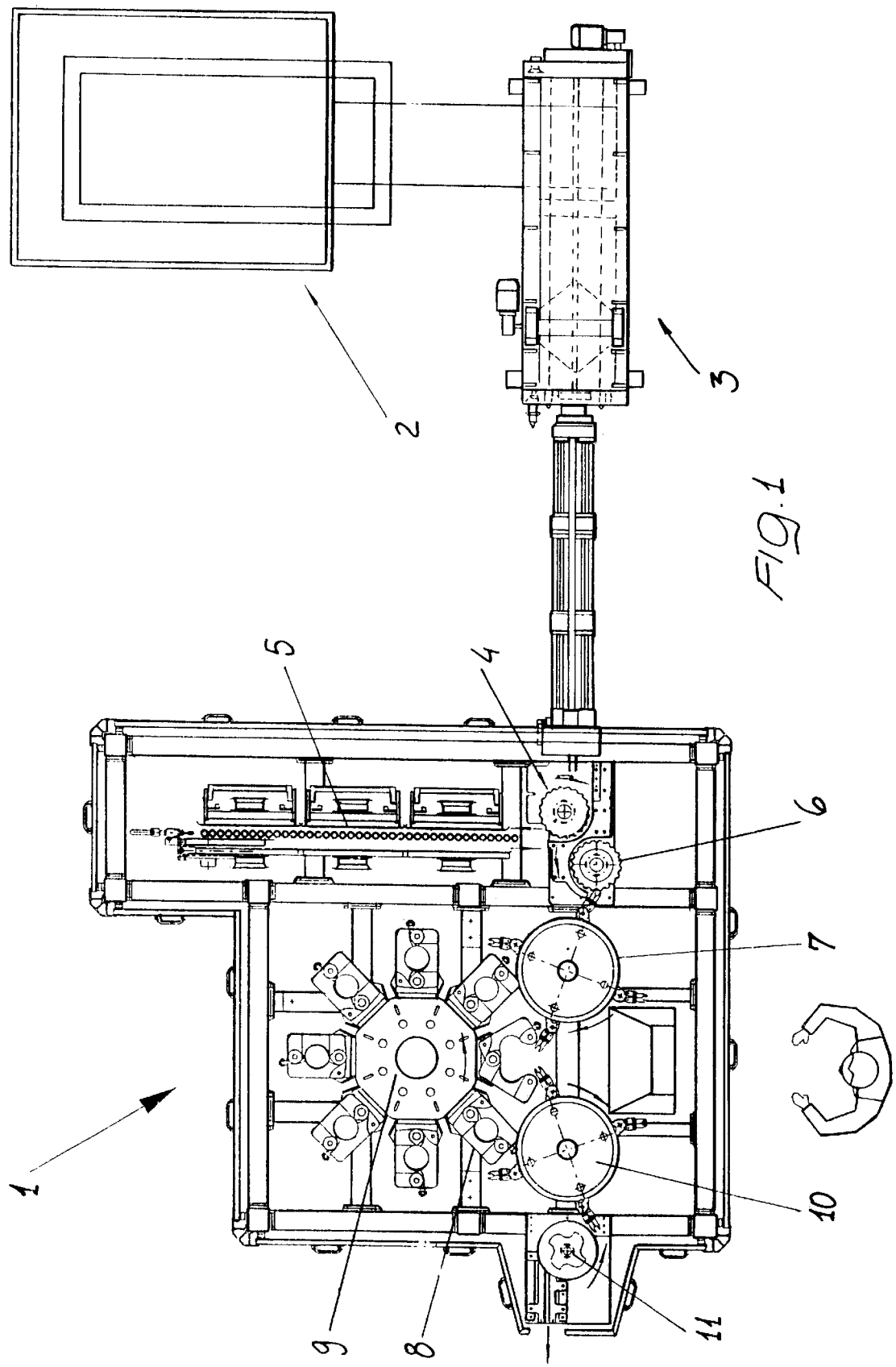
FIG. 1 is a top plan view illustrating the rotary blow molding machine according to the present invention.

The blow molding machine of FIG. 1 has been generally indicated by the reference number 1 in FIG. 1 and comprises a rotary machine for making PET bottles 56 starting from blow molded preforms or parisons 55 (FIG. 7) supplied by a supplying device 2 and a following preform orienting device 3.

The preform, after having been oriented, is supplied to the oven 5 of the machine 1 through a toothed wheel 4.

Said oven 5, in particular, is provided for heating the supplied preforms or parisons to their stretching-blowing temperature, the thus heated preforms or parisons, coming from said oven, being successively taken and conveyed, through a toothed wheel 6, toward a variable-pitch star element 7 for supplying the preforms to the molds 8.

Said molds, in particular, are mounted on a rotary table or carousel 9, driven by a suitable drive unit (not shown) which is in turn controlled independently by an electronic central unit, which has not been specifically shown.

A further variable pitch star element 10 takes the formed bottles from the related molds 8 to send the taken bottles to a wheel 11 for removing said bottles from the machine 1.

Figure 2:
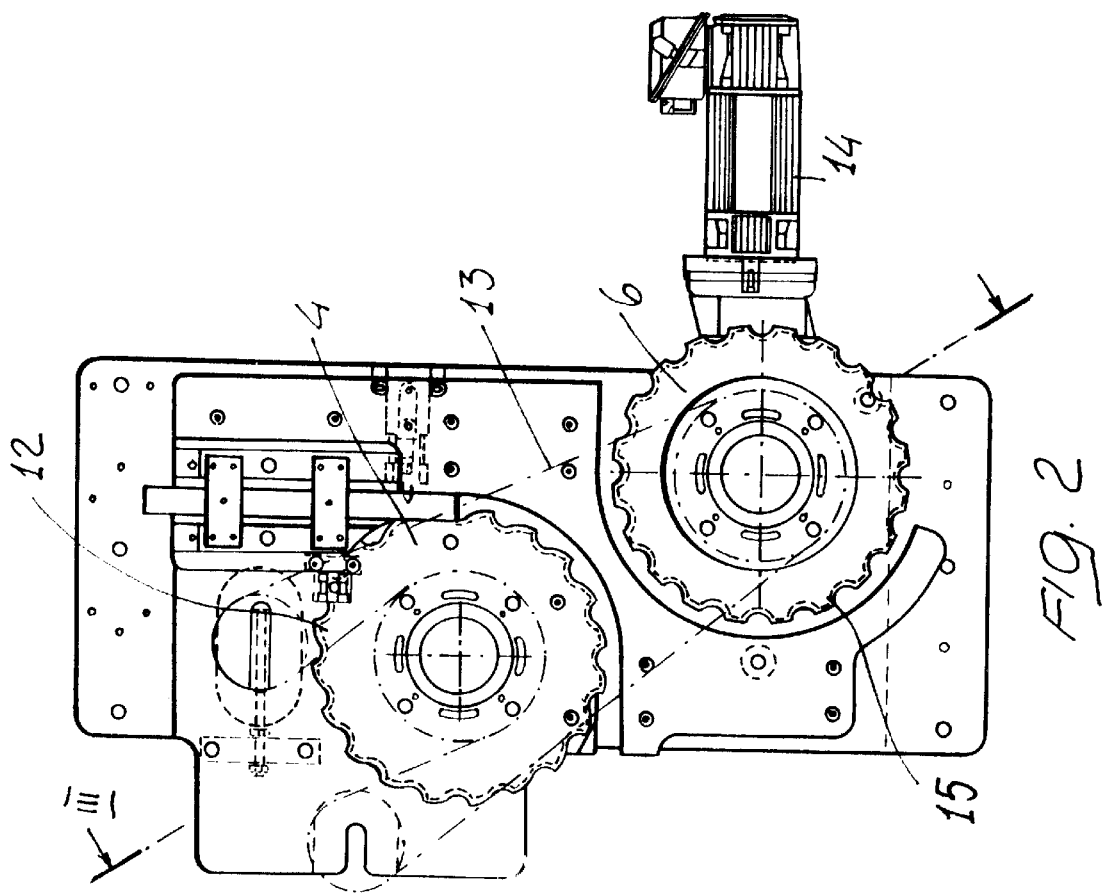
FIG. 2 is a further top plan view illustrating a detail of a supply and unloading wheel assembly for supplying the preforms to and unloading said preforms from an oven included in the machine of FIG. 1.
Figure 3:
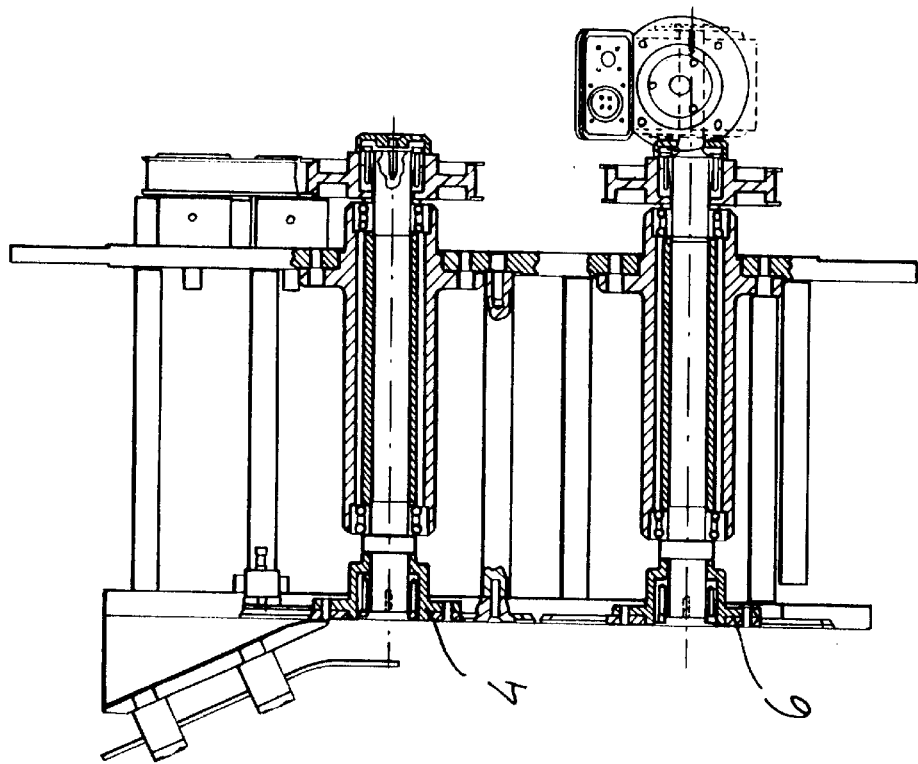
FIG. 3 is a cross-sectional view substantially taken along the cross line III—III of FIG. 2 illustrating the detail of FIG. 2.

The toothed wheels 4 and 6 of the inventive machine are clearly shown in FIGS. 2 and 3. In particular, the wheel 4 for supplying the preforms to the oven 5 is provided with a plurality of gripping teeth 12 for gripping said preforms and is rotatively driven by a cogged or toothed belt 13, in turn driven by an independent motor-reducing unit 14, also controlled by the above mentioned central control unit.

More specifically, the wheel 6 is provided with a plurality of teeth 15 for taking the preforms at the outlet of said oven 5 and being rotatively driven by said motor 14.

Figure 4:
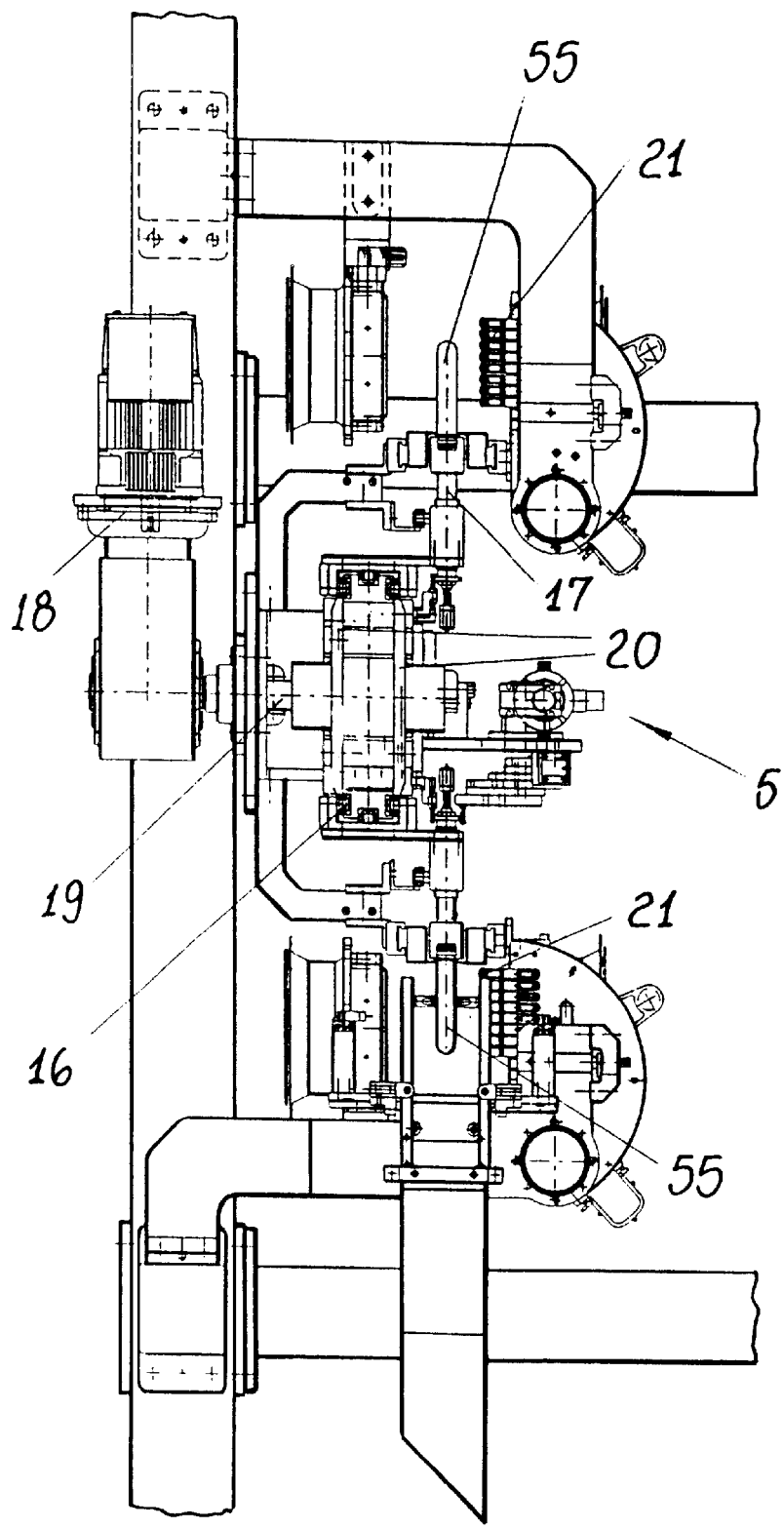
FIG. 4 illustrates the oven of the machine shown in FIG. 1, as seen from B.

The oven 5 shown in FIG. 4 is provided with a chain 16 driving the mandrels 17 for gripping the preforms 55.

Figure 5:
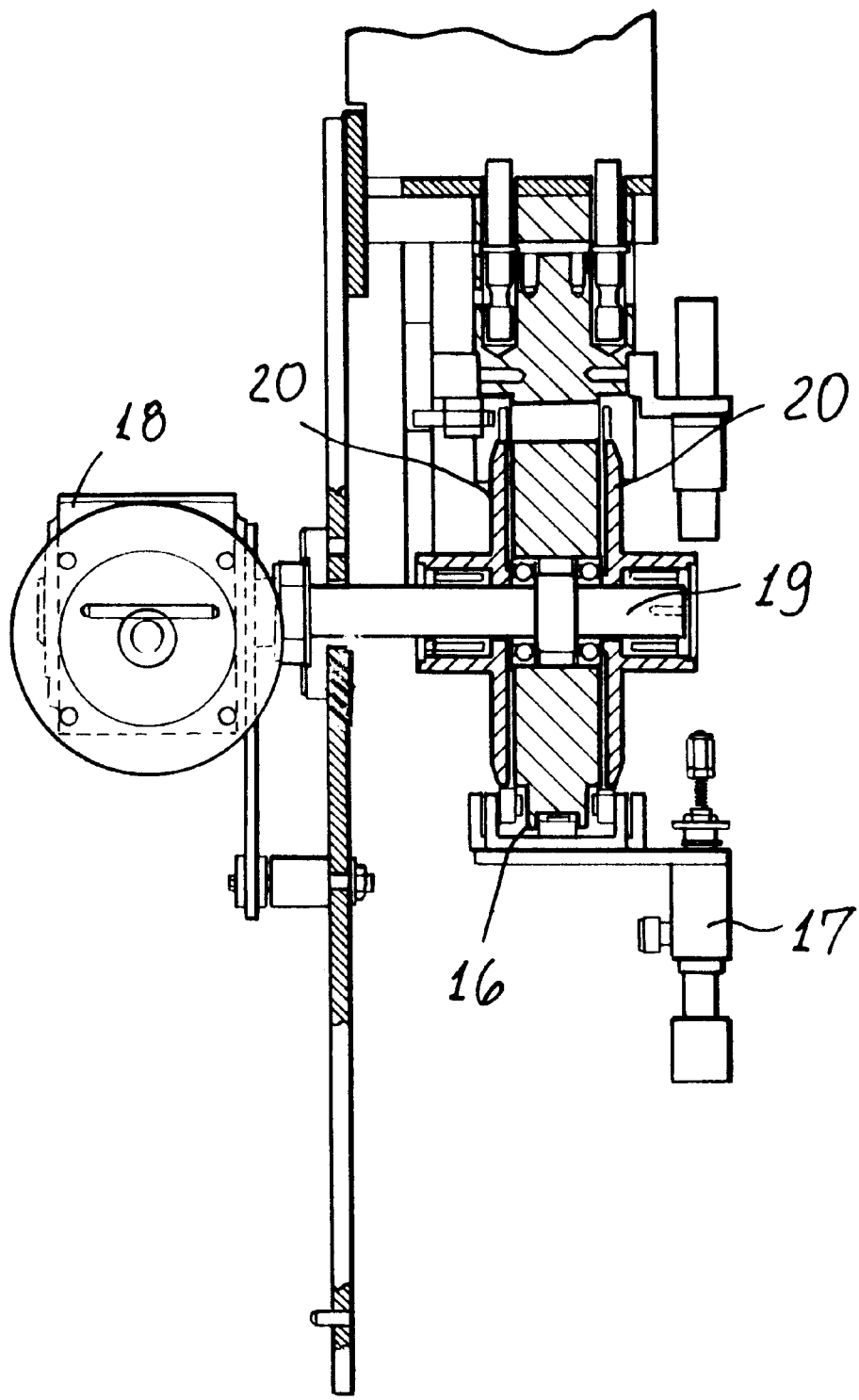
FIG. 5 is a partially cross-sectioned view illustrating a pulling wheel detail of the oven shown in FIG. 4.

Said drive chain, in particular, is driven by a motor-reducing assembly 18, provided with a shaft 19 and pinion 20 system (FIG. 5), said motor being also controlled, in an independent manner, by the mentioned central control unit.

The preforms 55 in said oven 5 are heated by IR (infrared) lamps 21.

The variable-pitch star elements 7 and 10 (FIGS. 6 and 7) respectively for supplying the preforms to the molds 8 and taking the formed bottles from said molds, comprise rotary wheels, respectively indicated by the reference numbers 22 and 23, including a plurality of grippers 24 which are radially assembled on said wheels.

The latter are rotatively driven by respective driving motors 25 and 26, also independently controlled by the mentioned central control unit, and being associated with their related reducers 27, 28 and shafts 29, 30.

The pitch of the variable-pitch star elements 7 and 10 can be changed by cams, respectively indicated by 31, 32 for the wheel 22 and 33, 34 for the wheel 23.

Figure 9:
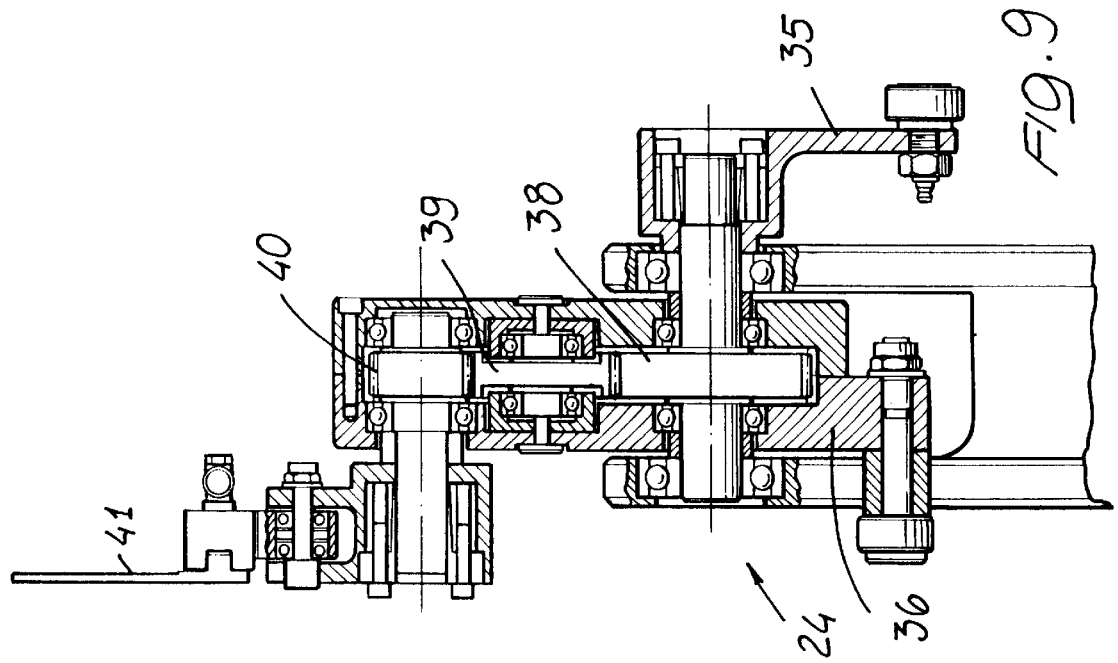
FIG. 9 is a cross sectional view illustrating the gripper of FIG. 8.
Figure 8:
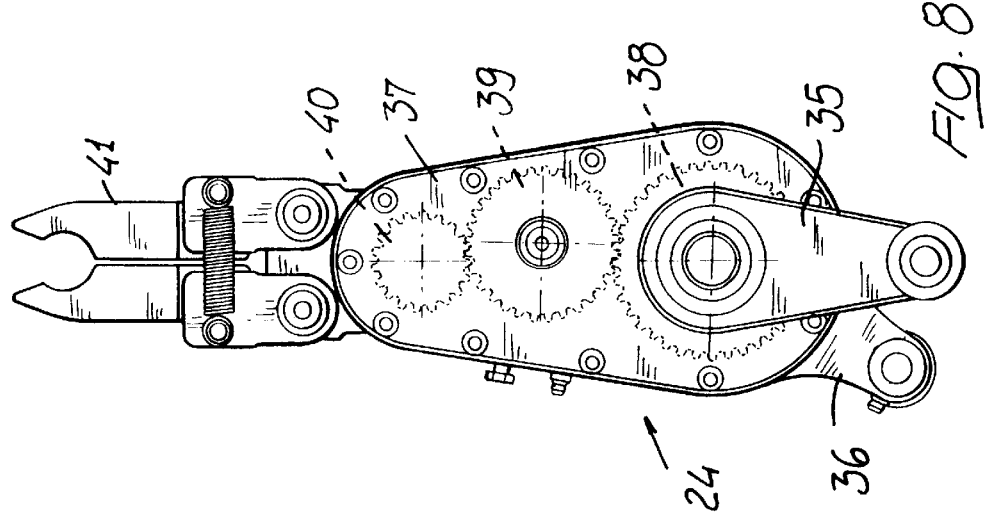
FIG. 8 is a top plan view illustrating the detail of one of the grippers of the star elements shown in FIG. 7, and a related driving mechanism.

These cams operate on the lever 35 and respectively on the lug 36 of the box 37 holding the gripper mechanisms 24 (FIGS. 8 and 9).

The mentioned mechanisms comprise a first toothed wheel 38 rigid with the lever 35 and meshing with a second toothed wheel 39, in turn kinematically coupled to a third toothed wheel 40.

The diameter of said wheels is decreasing, thereby allowing a set pitch variation of the grippers 24, the gripping elements 41 are driven through the kinematic chain of the cams 31, 32 and 33, 34—lever 35 and lug 36—toothed wheels 38, 39, 40.

Figure 10:
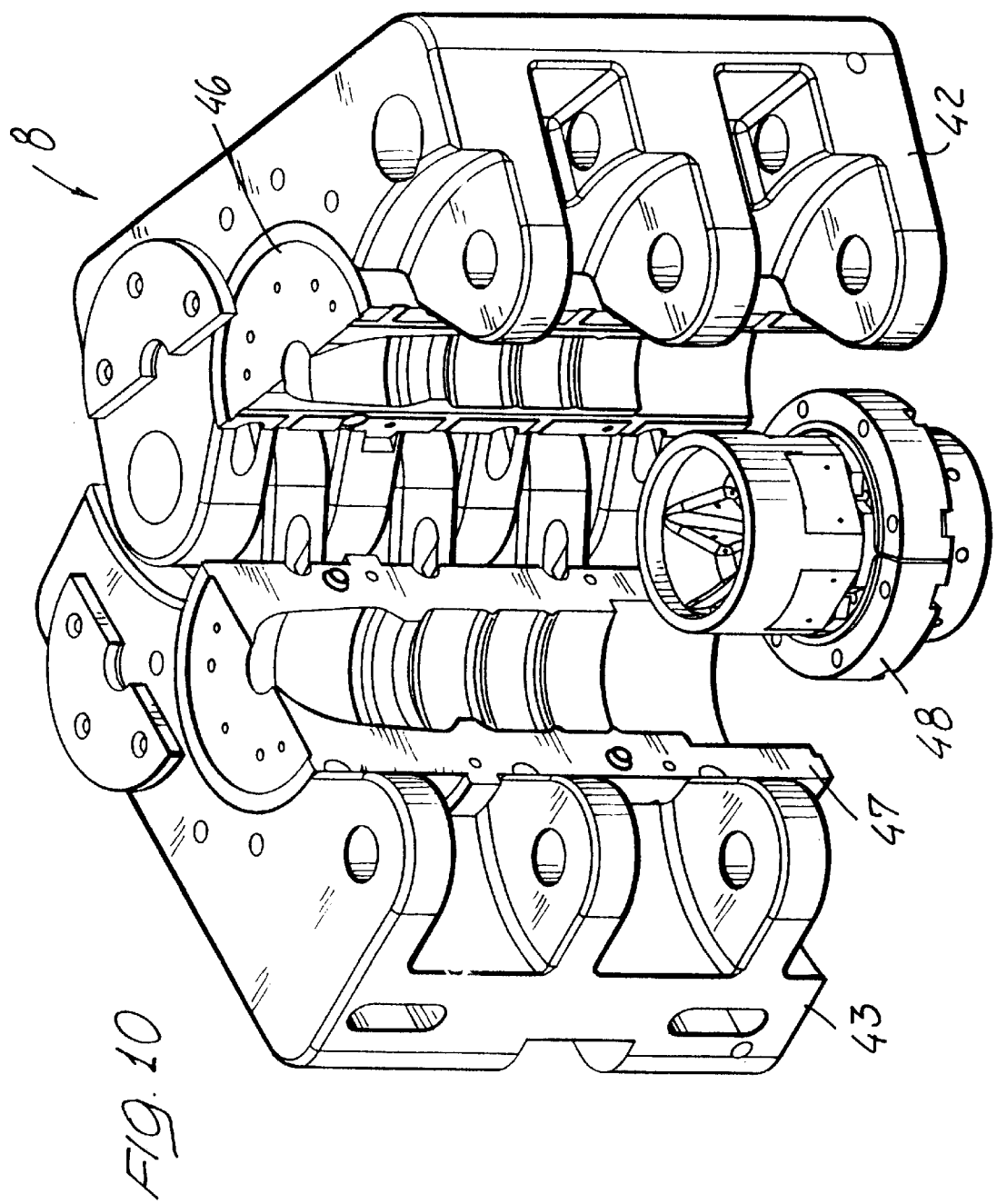
FIG. 10 is a schematic view illustrating one of the blowing molds provided on the machine of FIG. 1, in an open position of said blowing mold.
Figure 11:
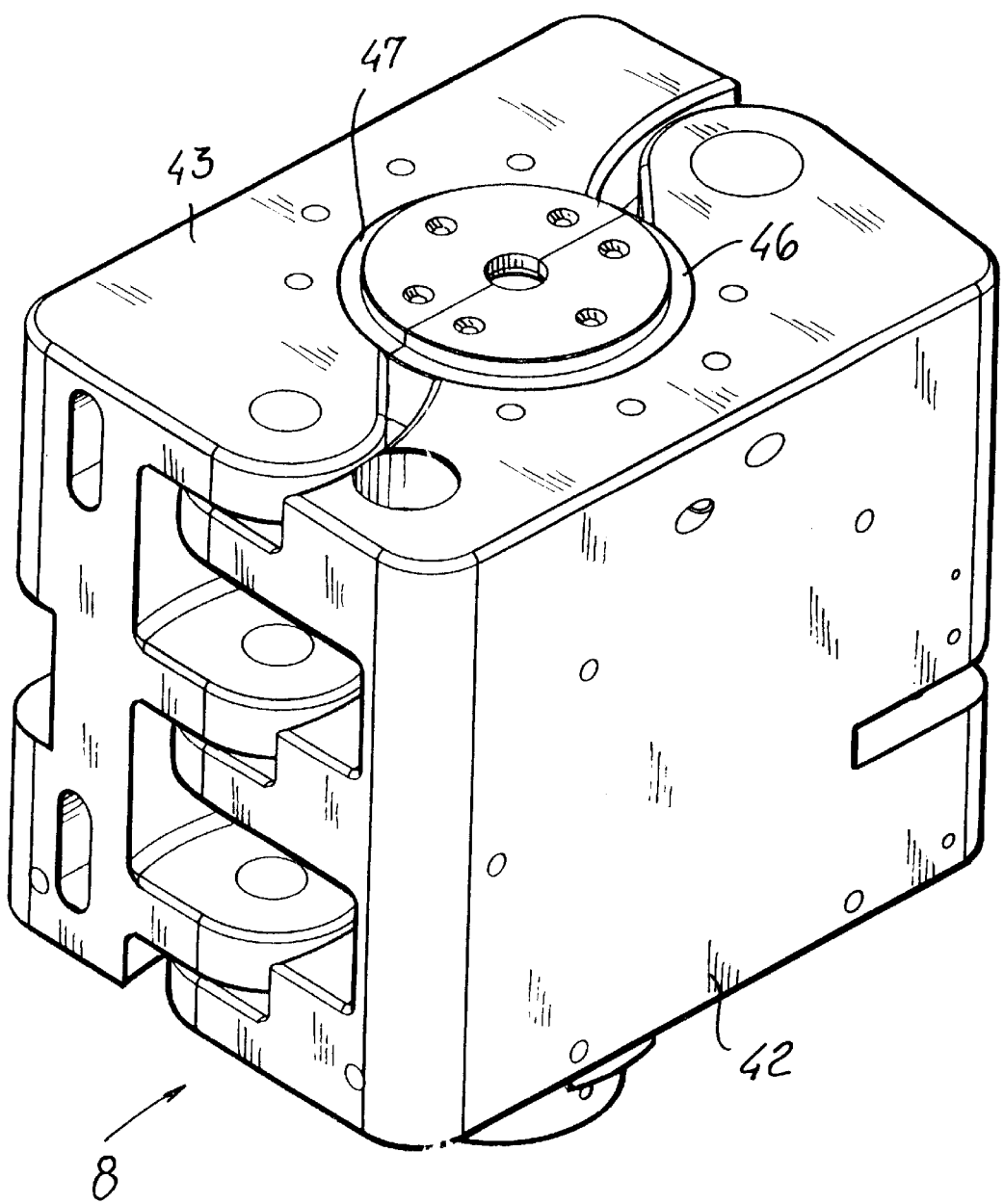
FIG. 11 illustrates the blowing mold of FIG. 10 in a closed position.

The mold 8 shown in FIGS. 10 to 12 comprises two outer half-shells, respectively indicated by the reference number 42, having a stationary housing 44, and 43 having a floating housing 45.

Inside the housings 44, 45 are arranged the half-shells, respectively 46 and 47, of the blowing mold.

A bottom element 48 is completing the molds 8. As shown, the half-shell 46 of the mold is fixed by screws at a stable position inside its housing 44 in the outer half-shell 42. The half-shell 47 of the mold 8 is in turn housed, at a movable position, inside the floating housing 45 of the half-shell 43.

In order to allow the half-shell 47 of the mold to radially move in the closure direction or to move toward the opposite half-shell 46, on said floating housing 45 counter-pressure chambers 49, 50, 51 defined by corresponding slots 52 housing air sealing means (not shown) are made.

The floating half-shell 47 is affixed, by screws, in its respective housing 45, and is suitable to perform a set radial displacement.

In operation, pressurized air is injected into said counter-pressure chambers 49, 50, 51 thereby pressing the floating half-shell 47 against the stationary half-shell 46, in order to remove any wear clearances from the mold or possible machining defects thereof.

The above disclosed operation will be performed with the half-shells in a closed condition, during the bottle forming step.

Figure 14:
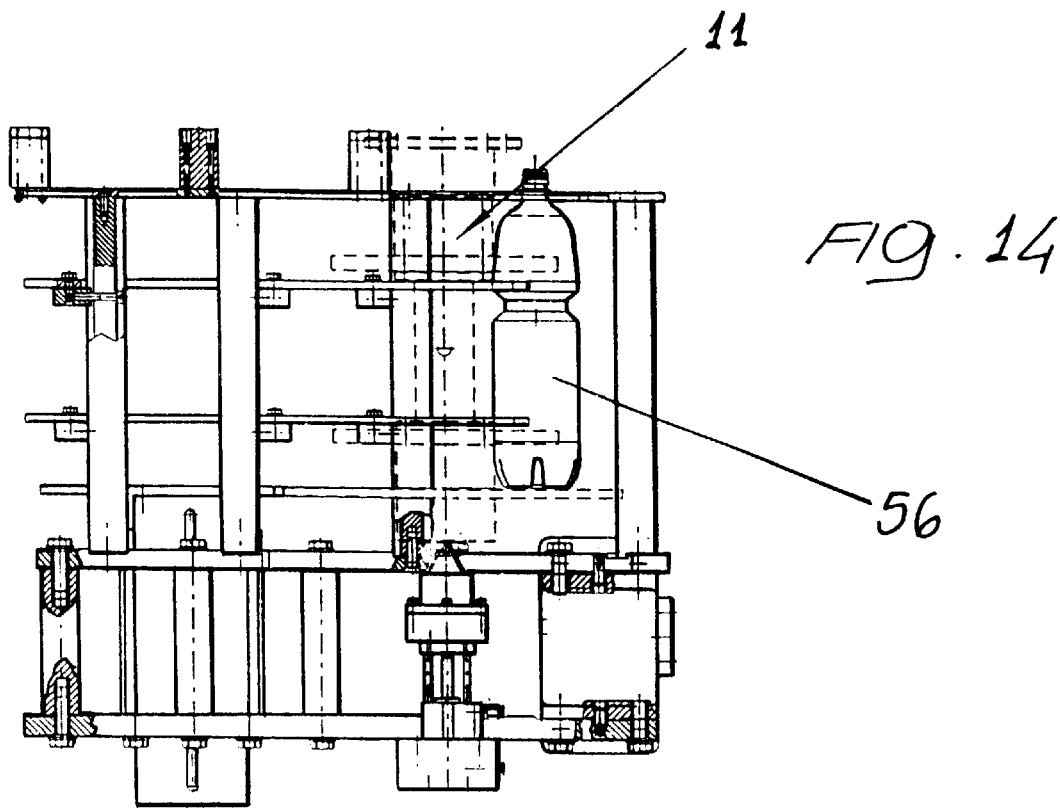
FIG. 14 illustrates the detail of FIG. 10 as seen from B, of the machine shown in FIG. 1.
Figure 13:
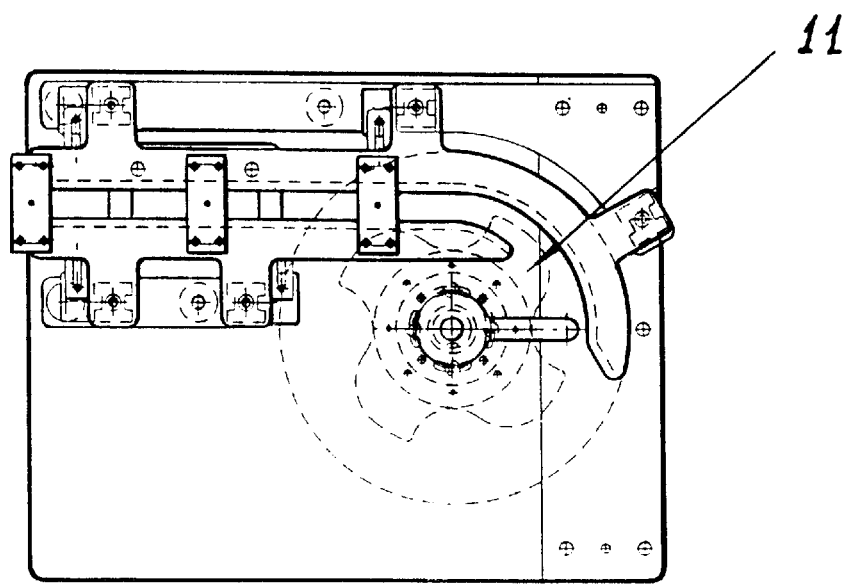
FIG. 13 is a top plan view illustrating a detail of the taking wheel for removing the formed bottles from the machine of FIG. 1.

The wheel 11 for taking the bottles 56 from the star element 10 of FIG. 7, clearly shown in FIGS. 13 and 14, is mounted at the latter and is rotatively driven by the same motor 26 driving said star element 10, through a driving belt engaged on the pulleys 53, 54 of FIG. 7.

As stated, the machine comprises moreover a control central unit for controlling all of the driving motors of the functional parts constituting the machine. More specifically, each motor has its electronic servo-drive coupled by optic fibers to said central unit, controlling its synchronous operation.

Owing to the above disclosed construction including a plurality of mutually independent parts, it is possible to change, for example, the number of the blowing molds 8 without redesigning the kinematic part of all of the components of said machine.

What is claimed is:

1. A rotary machine for making plastic vessels or bottles starting from molded preforms, comprising driving means for independently driving set kinematic parts of said machine, said driving means comprising motor-reducing assemblies independently controlled for respectively driving a rotary table supporting a plurality of blowing molds, toothed wheels for supplying a plurality of preforms to an oven and for taking said preforms from said oven, conveyor chain means for conveying said preforms into and through said oven, and star elements for loading said preforms into said blowing molds and taking blow molded bottles from said blowing molds, said motor-reducing assemblies being controlled, in a mutual independent manner, by an electronic central control unit, a toothed belt for driving said wheels said wheels having a plurality of gripping teeth for gripping said preforms to be supplied to said oven and said preforms at an outlet of said oven, a shaft and pinion system for driving said conveyor chain means, said conveyor chain means being moveover provided with gripping mandrels for gripping said preforms, said star elements having a variable pitch and being rotatively driven by said motor-assemblies provided with related reducers and rotary shafts, said star elements having rotary wheels including a plurality of grippers radially assembled on said rotary wheels, said star elements comprising cams for said rotary wheels, said grippers including each a lever and lug rigid with a box holding therein driving mechanisms for driving said grippers, said cams cooperating with said lever and said lug, wherein said gripper driving mechanisms comprise a first toothed wheel rigid with said lever and meshing with a second toothed wheel in turn kinematically coupled to a third toothed wheel.

2. A machine according to claim 1, wherein a diameter of said first, second and third wheels is decreasing thereby providing a set pitch variation of said grippers, said grippers including gripping elements driven by a kinematic chain comprising said cams, lever and lug, and said first, second and third toothed wheels.

* * * * *